United States Patent
Sugiyama

[19]

[11] Patent Number: 6,008,601
[45] Date of Patent: Dec. 28, 1999

[54] ENERGIZATION CONTROLLER FOR AN ELECTRIC MOTOR

[75] Inventor: Masanori Sugiyama, Aichi Pref., Japan

[73] Assignee: Aisin Seiki Kabushiki Kaisha, Kariya City, Japan

[21] Appl. No.: 09/088,049

[22] Filed: Jun. 1, 1998

[51] Int. Cl.[6] .................................................. H02K 23/00
[52] U.S. Cl. ........................ 318/254; 318/701; 318/373
[58] Field of Search ................................... 318/254, 701, 318/362, 367, 366–7, 369, 373

[56] References Cited

U.S. PATENT DOCUMENTS

| | | | |
|---|---|---|---|
| 4,558,265 | 12/1985 | Hayashida et al. | 318/561 |
| 5,225,758 | 7/1993 | Sakano et al. | 318/701 |
| 5,343,382 | 8/1994 | Hale et al. | 363/98 |
| 5,739,662 | 4/1998 | Li | 318/701 |
| 5,859,519 | 1/1999 | Archer | 318/801 |
| 5,878,360 | 3/1999 | Nishino et al. | 180/412 |

FOREIGN PATENT DOCUMENTS

| | | |
|---|---|---|
| 1298940 | 12/1989 | Japan . |
| 7274569 | 10/1995 | Japan . |
| 7298669 | 10/1995 | Japan . |
| 8172793 | 7/1996 | Japan . |

*Primary Examiner*—David Martin
*Attorney, Agent, or Firm*—Sughrue, Mion, Zinn, Macpeak & Seas, PLLC

[57] ABSTRACT

An energization controller for an electric motor eliminates the possibility that a motor driver may be destroyed when the electric motor rotates in the opposite direction from its driving direction. The energization controller comprises energization circuits which are composed of an H type circuit together with an electric coil; a chopping control device for selectively performing a hard chopping mode of alternately repeating a switch-on operation of turning on both switching elements and a switch-off operation of turning off both the switching elements and a soft chopping mode of alternately repeating a switch-on operation of turning on both the switching elements and a singular-on operation of turning off one switching element and turning on the other switching element; a direction detection device for detecting a rotational direction of the motor; and a chopping mode control device for detecting whether or not the rotational direction coincides with a driving direction and for instructing the chopping control device to perform the hard chopping mode during when those directions do not coincide.

2 Claims, 13 Drawing Sheets

Current Map

| | Torque (N·m) | | | | | | |
|---|---|---|---|---|---|---|---|
| | | 10 | 15 | 20 | 25 | 30 | 35 |
| Rotational Speed (rpm) | : | : | : | : | : | : | : |
| | 200 | C11 | C21 | C31 | C41 | C51 | C61 |
| | 300 | C12 | C22 | C32 | C42 | C52 | C62 |
| | 400 | C13 | C23 | C33 | C43 | C53 | C63 |
| | 500 | C14 | C24 | C34 | C44 | C54 | C64 |
| | 600 | C15 | C25 | C35 | C45 | C55 | C65 |
| | 700 | C16 | C26 | C36 | C46 | C56 | C66 |
| | : | : | : | : | : | : | : |

Example
(Contents of C34) : 52.5 degrees Energization ON Angle
82.5 degrees Energization OFF Angle
200 (A) Current Target Value Energization Map

| Rotor Angle | Current Value [A] | | |
|---|---|---|---|
| | 1st Phase | 2nd Phase | 3rd Phase |
| ⋮ | ⋮ | ⋮ | ⋮ |
| 51.0 | 0 | 0 | 192 |
| 51.5 | 0 | 0 | 195 |
| 52.0 | 0 | 0 | 198 |
| 52.5 | 0 | 0 | 200 |
| 53.0 | 0 | 0 | 200 |
| 53.5 | 0 | 0 | 200 |
| ⋮ | ⋮ | ⋮ | ⋮ |

Wave form Map

| Rotational Speed (rpm) | Contents | |
|---|---|---|
| | Rising Required Angle (D1n) | Falling Required Angle (D2n) |
| 200 | D11 | D21 |
| 300 | D12 | D22 |
| 400 | D13 | D23 |
| 500 | D14 | D24 |
| 600 | D15 | D25 |
| 700 | D16 | D26 | ns of turning ON both first and
ENERGIZATION CONTROLLER FOR AN ELECTRIC MOTOR

BACKGROUND OF THE INVENTION

1. Field of the Invention

The present invention relates to an energization controller for controlling the ON/OFF condition of an H-type switching circuit for feeding chopped electricity to an electric coil of an electric motor.

2. Description of the Prior Art

A switching circuit for feeding electricity to a switched reluctance motor will be explained with reference to the drawings. The switched reluctance motor (hereinafter referred to as an SR motor) comprises a rotor configured so that pole sections protrude outwardly and a stator configured so that pole sections protrude inwardly. The rotor is an iron core comprised of laminated iron plates and the stator has a coil wound on each pole. The SR motor functions by operating each pole of the stator as an electromagnet and rotating the rotor by attracting each pole section of the rotor by the magnetic force of the stator. Accordingly, the rotor can be rotated in a desired direction by sequentially switching the power-ON state of the coil wound around each pole of the stator corresponding to the rotational position of each pole of the rotor. This type of SR motor is disclosed in Japanese Patent Laid Open No. Hei. 01-298940.

Because the power ON/OFF state of each pole of the stator is switched when each pole of the rotor is located at a specific rotational position in the SR motor, a magnitude of magnetic attraction force applied to the rotor changes abruptly by switching the ON/OFF state. Therefore, relatively large mechanical vibrations occur in the rotor and the stator and noise is also generated by this vibration.

In the above mentioned prior art technology disclosed in Japanese Patent: Laid Open No. Hei. 01-298940, a rotational position signal having a moderate leading edge and trailing edge is generated and is utilized to moderate the rise of current in energizing the electric coil and fall of the current in de-energizing the electric coil. This enables the suppression of vibrations and noise. However, since the rotational position signal is used, the effect of suppressing the noise is reduced when the rise of current in energizing the electric coil and the fall of current in de-energizing the electric coil become substantially fast when rotating the motor at a low speed. The current flow becomes very small and the torque generated becomes small since the power ON time for each energization is shortened when the rise of current in energizing the electric coil and the fall of current in de-energizing the electric coil become substantially slow when rotating the motor at high speed. Furthermore, efficiency may drop and the required torque may not be produced unless the timing for switching the ON/OFF control of the energization is changed corresponding to the number of revolutions and the required torque.

According to prior art technologies disclosed in Japanese Patent Laid Open Nos. Hei. 07-274569, Hei. 07-298669 and Hei. 08-172793, an H type switching circuit is used to control motor energizing current by a PWM to smooth the rise and fall of the energization and to control switching modes to improve torque.

For instance, as shown in FIG. 11a, the H type switching circuit comprises a first switching element 19a interposed between one end of an electric coil 1a and a first power line 18e, a second switching element 18b interposed between the other end of the electric coil 1a and a second power line 18f, a first diode D1 which is interposed between one end of the coil 1a and the second power line 18f and which permit current to be conducted from the latter to the former and a second diode D2 which is interposed between the other end of the coil 1a and the first power line 18e and which permit current to be conducted from the former to the latter.

A rotational driving current flows through the electric coil 1a as shown in FIG. 11a when the first and second switching elements 18a and 18b are both turned ON and a feedback current to the power source caused by an induced voltage of the electric coil 1a flows through the electric coil 1a as shown in FIG. 11b when they are both turned OFF. A pulsating current shown in FIG. 11c flows through the electric coil 1a by repeatedly turning the transistors ON and OFF as described above alternately by the PWM control. This switching mode will be referred to as "hard chopping" in the present specification. Energy generated by the electric coil 1a is supplied (regenerated) to the first power line 18e and the current is sharply reduced at time intervals during when the first and second switching elements 19a and 18b are both turned OFF as shown in FIG. 11b. Because pulsation of the current caused by the switching elements when they are switched ON/OF is large, pulsation of magnetic attraction force applied to the rotor of the electric motor is large, thus causing large vibration and noise.

A current whose pulsation is relatively small flows through the electric coil 1a as shown in FIG. 12c by alternately repeating operations of turning ON both first and second switching elements 18a and 18b as shown in FIG. 12a (similar to FIG. 11a) and of turning OFF only the first switching element 18a while keeping the second switching element 18b ON as shown in FIG. 12b. This switching mode will be referred to as "soft chopping" in the present specification. The current reduces moderately and hence the driving force of the motor and the attraction force in the radial direction are reduced moderately during the period in which the first switching element 18a is OFF and the second switching element 18b is ON as shown in FIG. 12b. Accordingly, noise and vibration are reduced when the motor is energized in the "soft chopping" mode.

The energization controller disclosed in the above mentioned Japanese Patent Laid Open Nos. Hei. 07-274569, 07-298669 and 08-172793 has realized the reduction of vibration and high torque by selecting the above mentioned "hard chopping" and "soft chopping" corresponding to the rotating condition of the SR motor.

However, because the energy generated by the electric coil 1a does not return to the first power line 18e during the time interval when the first switching element 18a is OFF and the second switching element 18b is ON as shown in FIG. 12b in the "soft chopping" mode, the rotor vibrates and jumps in the direction opposite from the driving direction due to a torque ripple and the like at the initial period of rotation right after starting to drive the electric motor. Thus, a reverse rotation occurs as shown in FIG. 13 and when this reverse rotation is large or is repeated in a short time, the current in the electric coil 1a may increase and the switching elements may be destroyed due to the induced voltage of the electric coil 1a caused by the reverse rotation of the rotor.

When an electric motor is mounted in a vehicle for driving the wheels, the rotor of the electric motor may well rotate temporarily in a reverse direction due to inverse torque applied to the wheels right after the drive of the electric motor is started to start the vehicle, in climbing a slope at low speed, in clearing a curb stone during driving the vehicle into/out of a garage or when forward/backward is quickly switched. Thus, it is desirable to reduce the possibility of destroying the switching elements.

SUMMARY OF THE INVENTION

Accordingly, it is an object of the present invention to solve such problems by adopting soft chopping.

The energization controller for an electric motor according to the present invention comprises first switching means (18a) interposed between one end of an electric coil (1a) of the electric motor (1) and a first power line (18e); second switching means (18b) interposed between the other end of the electric coil (1a) and a second power line (18f); a first diode (18c) which is interposed between said one end of the electric oil (1a) and the second power line (18f) and which permits a current to be conducted from the latter to the former; a secorid diode (18d) which is interposed between the other end of the electric coil (1a) and the first power line (18e) and which permits a current to be conducted from the former to the latter; chopping control means (15 through 17) for selectively performing a hard chopping mode of alternately repeating a switch-on operation by turning on both first and second switching means (18a and 18b) and a switch-off operation by turning off both first and second switching means (18a and 18b) and a soft chopping mode of alternately repeating a switch-on operation by turning on both first and second switching means (18a and 18b) and a singular-on operation of turning off the first switching means (18a) and turning on the second switching means (18b); direction detecting means (1d and 5) for detecting a rotational direction of the electric motor (1); and chopping mode control means (17c and 17d) for detecting whether or not the rotational direction coincides with a specified direction and for instructing the chopping control means (15 through 17) to perform the hard chopping mode when those directions do not coincide. It is noted that the reference numerals of the corresponding components which are shown in the drawings and which are described later in the preferred embodiment are added in parentheses for reference in order to facilitate the understanding of the invention.

The direction detecting means (1d and 5) detects a rotational direction of the electric motor (1) and the chopping mode control means (17c and 17d) detects whether or not the rotational direction of the electric motor (1) coincides with a specified direction and instructs the chopping control means (15 through 17) to perform the hard chopping mode when those directions do not coincide so that the hard chopping is always performed when the rotational direction of the electric motor (1) is opposite from the specified direction. That is, when the rotational direction of the electric motor (1) is opposite from the specified direction, the operation of turning on the first and second switching means (18a and 18b) shown in FIG. 11a and the operation of turning off both switching means (18a and 18b) shown in FIG. 11b are performed alternately and energy generated by the electric coil (1a) is supplied (regenerated) to the first power line (18e) when both switching means (18a and 18b) are OFF, so that the switching means will not be destroyed.

The above and other objects, features and advantages of the present invention will be more apparent and more readily appreciated from the following detailed description of preferred exemplary embodiment of the present invention, taken in connection with the accompanying drawings.

BRIEF DESCRIPTION OF THE DRAWINGS

FIGS. 11a through 11c are diagrams showing a motor current in a hard chopping mode of an inverter 18 shown in FIG. 2, wherein FIG. 11a shows a current conducting direction when a driving current flows through the motor, FIG. 11b shows a current conducting direction when the supply of the driving current is shut off and FIG. 11c shows an outline of a current waveform in a time series manner.

FIGS. 12a through 12c are diagrams showing the motor current in a soft chopping mode of the inverter 18 shown in FIG. 2, wherein FIG. 12a shows a current conducting direction when a driving current flows through the motor, FIG. 12b shows a current conducting direction when the supply of the driving current is shut off and FIG. 12c shows an outline of a current waveform in a time series manner.

DETAILED DESCRIPTION OF THE INVENTION

Figure 1:
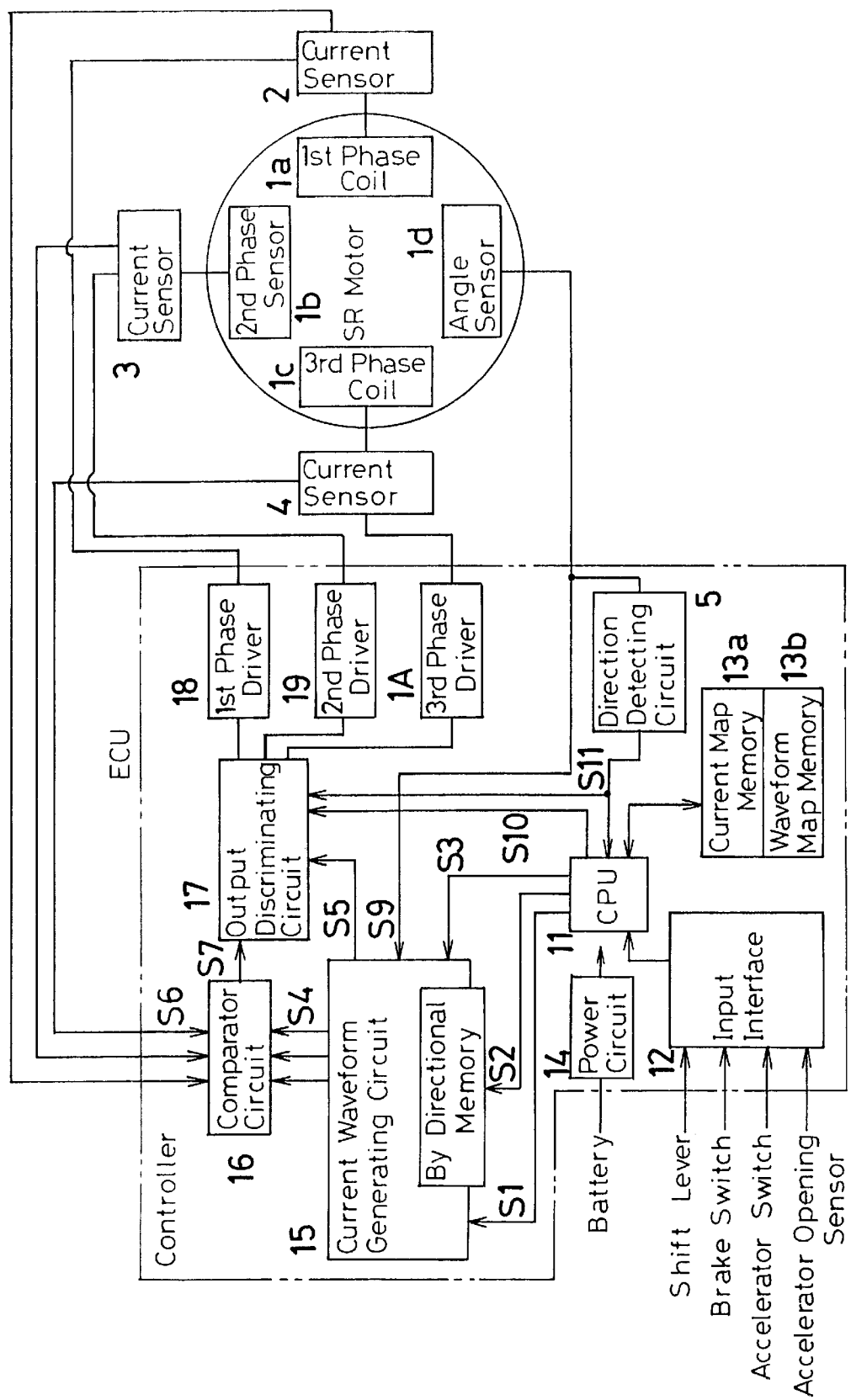
FIG. 1 is a block diagram showing a structure of one embodiment of the present invention.

FIG. 1 shows one embodiment of the present invention. The system shown in FIG. 1 constitutes a main part of a driving unit of an electric car. This exemplary system comprises an SR motor 1 which is controlled by a controller ECU. The controller ECU controls drive of the SR motor 1 based on information input from a shift lever, a brake switch, an accelerator switch and an acceleration opening sensor. Electric power is supplied from a car battery.

The SR motor 1 comprises three phases of coils 1a, 1b and 1c for driving it and an angle sensor 1d for detecting rotational position (angle) of a rotor. The three phases of coils 1a, 1b and 1c are connected with drivers 18, 19 and 1A within the controller ECU, respectively. Current sensors 2, 3 and 4 are provided on wires connecting the coil 1a with the driver 18, connecting the coil 1b with the driver 19 and connecting the coil 1c with the driver 1A, respectively. These current sensors 2, 3 and 4 output voltages proportional to currents actually flowing through the coils 1a, 1b and 1c as current signals S6, respectively.

The controller ECU comprises a CPU (microcomputer) 11, an input interface 12, a direction detecting circuit 5, a current map memory 13a, a waveform map memory 13b, a power circuit 14, a current waveform generating circuit 15, a comparator circuit 16, an output discriminating circuit 17 and the drivers 18, 19 and 1A. Based on the information input from the shift lever, the brake switch, the accelerator switch and the accelerator opening sensor, the controller ECU calculates a required rotational direction, a driving speed and driving torque of the SR motor 1 one by one and based on the result of the calculation, controls currents flowing to each of the coils 1a, 1b and 1c of the SR motor 1.

The angle sensor 1d outputs a binary signal of 10 bits showing an absolute value of an angle from 0 to 360 degrees. Its minimum resolution of detect angle is 0.5 degrees. Based on two low order bits of the signal output by the angle sensor 1d, the direction detecting circuit 5 detects a direction of rotation (clockwise direction CW/counterclockwise direction CCW) of the rotor of the SR motor 1, generates a direction detected signal. S11 of H(1) when the direction is CW and of L(0) when the direction is CCW and supplies it to the CPU 11 and the output discriminating circuit 17.

Figure 2:
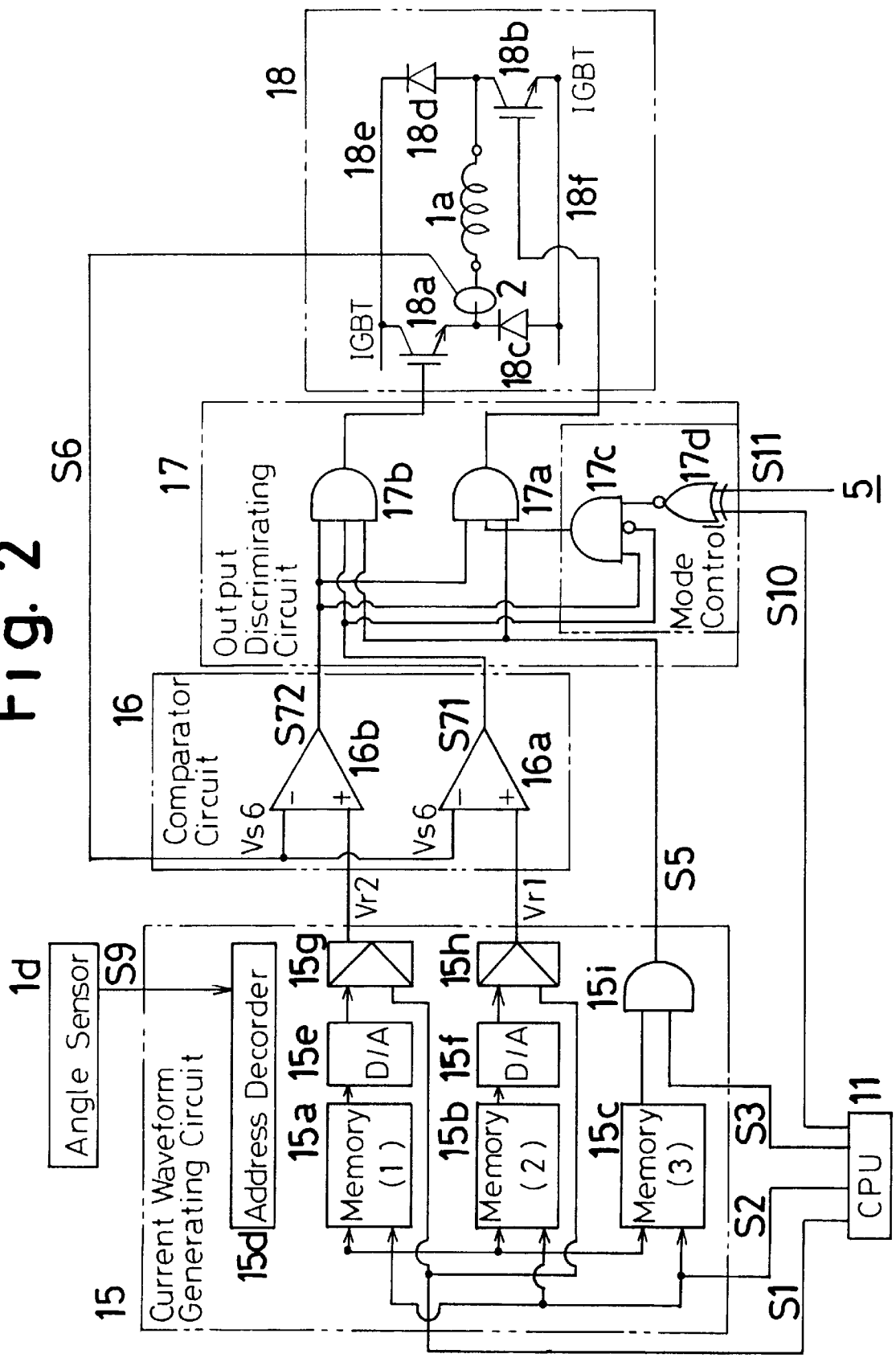
FIG. 2 is a block diagram showing a specific structure of a driving circuit of one phase among driving circuits of three phases in the main part shown in FIG. 1.

FIG. 2 shows a specific structure of the main part of the circuit shown in FIG. 1. Although only a circuit for controlling energization of the coil 1a of the SR motor 1 is shown in FIG. 2, the controller ECU also includes the same circuits for controlling energization of the other coils 1b and 1c.

As shown in FIG. 2, one end of the coil 1a is connected to a high potential line 18e of a power source via a switching transistor (IGBT) 18a and the other end of the coil 1a is connected to a low potential line 18f of the power source via a switching transistor (IGBT) 18b. Furthermore, a diode 18c is connected between an emitter of the transistor 18a and the low potential line 18f and a diode 18d is connected between an emitter of the transistor 18d and the high potential line 18e. Accordingly, when the transistors 18a and 18b are both turned ON (put into conductive state), a current flows between the power lines 18e and 18f and through the coil 1a and when either one or both are turned OFF (non-conductive state), no current is fed to the coil 1a.

The output discriminating circuit 17 comprises three AND gates 17a, 17b and 17c as well as an exclusive NOR gate 17d.

The exclusive NOR gate 17d gives to the AND gate 17c a mode specifying signal of H (meaning that soft chopping is enabled) when a signal S10 (H:CW/L:CCW) showing a required rotational direction, i.e. a specified direction, of the SR motor 1 decided by the controller ECU based on the information input from the shift lever, the brake switch, the accelerator switch and the accelerator opening sensor coincides with the direction detected signal S11 (H:CW/L:CCW) of the direction detecting circuit 5, i.e. when the rotor of the motor is rotating in the same direction with the specified direction, and gives a mode specifying signal of L (meaning that soft chopping is prohibited=hard chopping is specified) when the rotor is rotating in the opposite direction. An output terminal of the AND gate 17a is connected to a gate terminal of the transistor 18b and an output terminal of the AND gate 17b is connected to a gate terminal of the transistor 18a. Signals S72 and S5 as well as a mode switching specifying signal (output of the AND gate 17c) are input to an input terminal of the AND gate 17a and the signals S71, S72 and S5 are input to an input terminal of the AND gate 17b. The signals S71 and S72 are binary signals output by analog comparators 16a and 16b of the comparator circuit 16. The signal S5 is a binary signal output by the current waveform generating circuit 15.

The comparator circuit 16 comprises the analog comparators 16a and 16b. The analog comparator 16a compares a first reference voltage Vr1 output by the current waveform generating circuit 15 with voltage of the signal S6 corresponding to a current detected by the current sensor 2 and outputs its result as the binary signal S71 and the analog comparator 16b compares a second reference voltage Vr2 output by the current waveform generating circuit 15 with the voltage of the signal S15 corresponding to the current detected by the current sensor 2 and outputs its result as the binary signal S72. In the present embodiment, a relationship of Vr1<Vr2 always holds.

When the signal S5 is at high level H, states of the transistors 18a and 18b of the driver 18 are set at either one of the three states as shown in Table 1 corresponding to the relationship of magnitude among the voltage Vs6 of the signal S6, the reference Voltage Vr1 and the reference voltage Vr2.

TABLE 1

| Cases | Output of Comparator 16a | Output of Comparator 16b | Output of EX-NOR 17d | Output of AND 17a | Output of AND 17b | Tr 18a | Tr 18b |
| --- | --- | --- | --- | --- | --- | --- | --- |
| 1 Vs6 ≦ Vr1 | H | H | | H | H | ON | ON |
| 2 Vr1 < Vs6 ≦ Vr2 | L | H | H | H | L | OFF | ON |
| 3 Vr1 < Vs6 ≦ Vr2 | L | H | L | L | L | OFF | OFF |
| 4 Vs6 >Vr2 | L | L | | L | L | OFF | OFF |

Figure 11A:
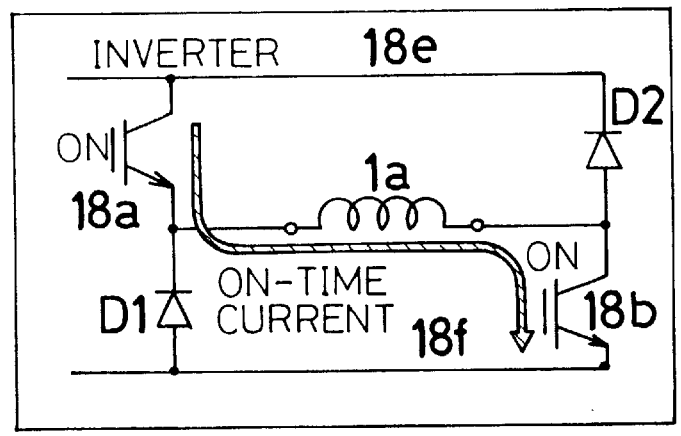
Figure 11B:
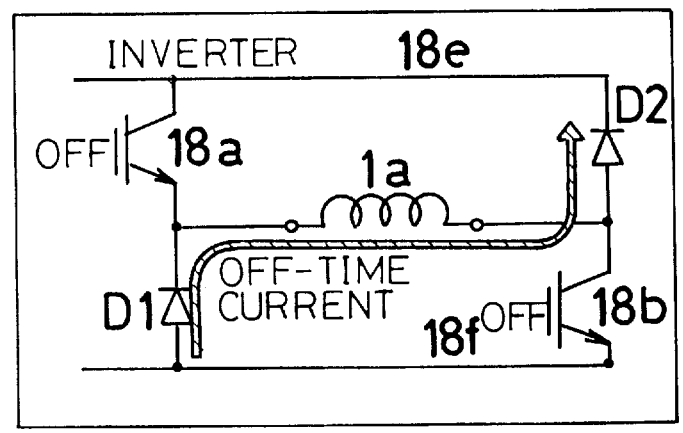
Figure 11C:
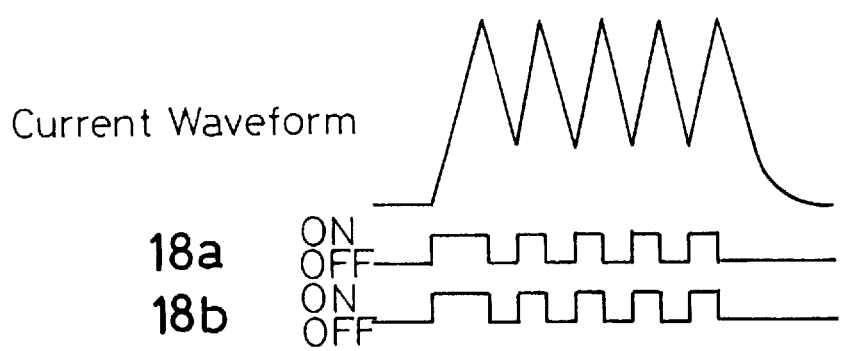
Figure 12A:
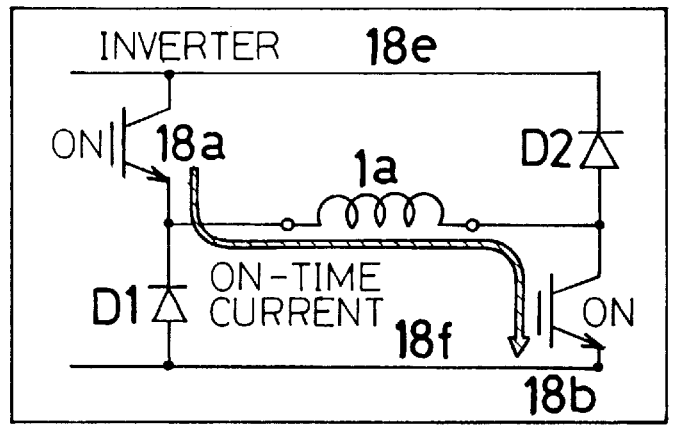
Figure 12B:
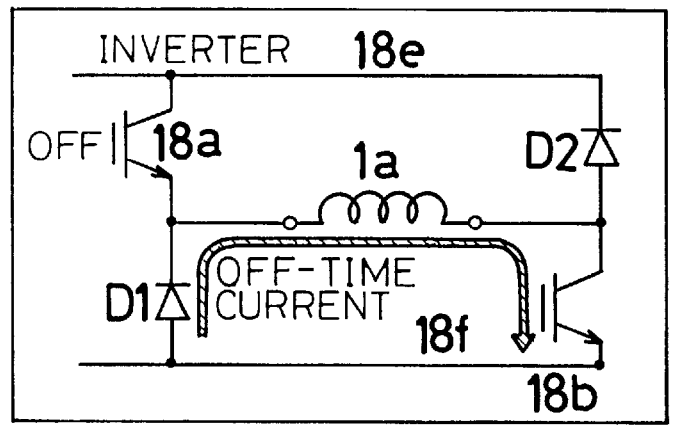
Figure 12C:
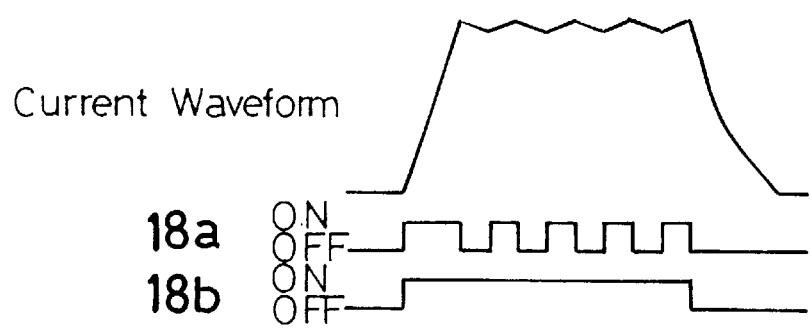
Figure 13:
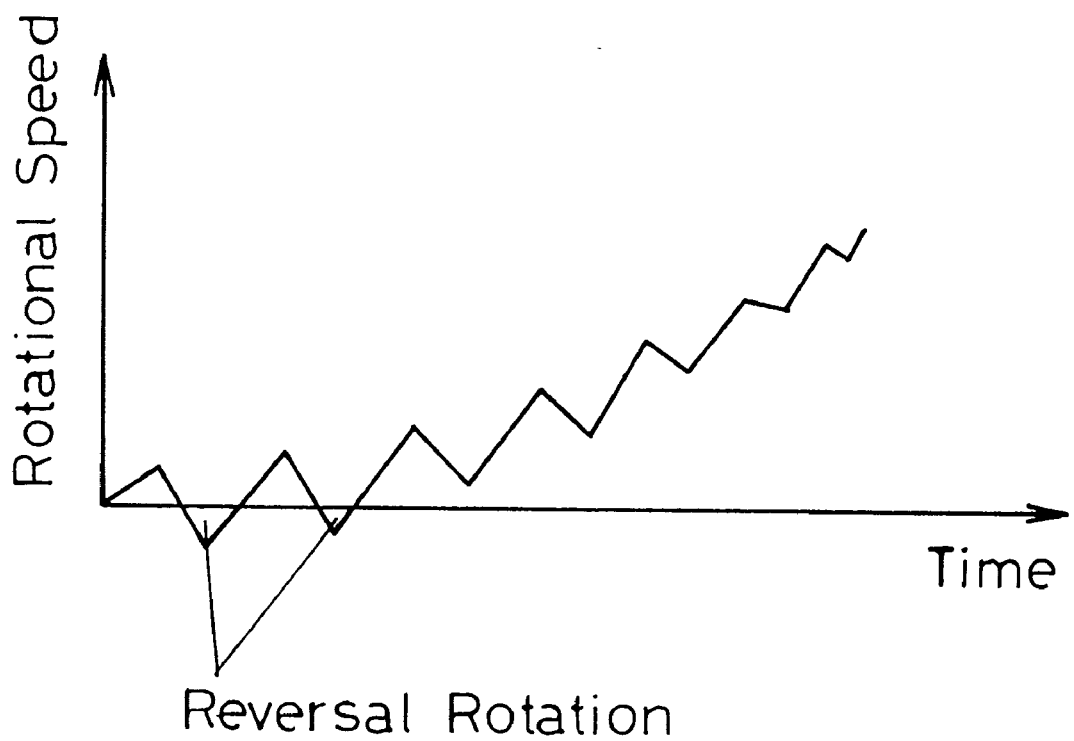
FIG. 13 is a graph showing changes in speed of the SR motor 1 shown in FIG. 1 right after drive is started, showing inversions which may occur depending on a circumstance.

Case (1) above is the state shown in FIGS. 11a and 12a, case (2) is the state shown in FIG. 12b and cases (3) and (4) are the states shown in FIG. 11b. The mode of alternately repeating cases (1) and (4) is the hard chopping mode and the mode of alternately repeating cases (1) and (2) is the soft chopping mode.

In case (3) of Vr1<Vs6≦Vr2, while the transistor 18a is turned OFF and the transistor 18b is turned ON to put them into the state shown in FIG. 12b similar to case (2), the mode is changed so that the transistors 18a and 18b are turned OFF so as to prevent the transistors 18a and 18b from being destroyed because the rotational direction of the electric motor is opposite from the specified direction.

That is, Vr1<Vs6≦Vr2, while the inputs from the comparators 16a and 16b to the AND gate 17c turn out to be a gate ON level, the mode specifying signal (H:soft chopping enabled/L:soft chopping prohibited) of the exclusive NOR gate 17d is given to one more input of the AND gate 17c. When this mode specifying signal is H, the mode turns out to be the case (2) (soft chopping mode) and when the mode specifying signal is L, the mode turns out to be the case (3) (hard chopping mode).

As described above, while there exist the states in which the transistors 18a and 18b are both turned ON, in which both are turned OFF and in which one is turned ON and the other is turned OFF, it is determined that which state is assumed by the level of Vs6 among three kinds of areas of whether it is smaller than Vr1, it is inbetween Vr1 and Vr2 and is greater than Vr2, and when it is inbetween Vr1 and Vr2, whether or not the rotational direction of the rotor of the motor is the same with the specified direction.

When the signal S5 is at low level L, the outputs of both the AND gates 17a and 17b always turn out to be low level L and the transistors 18a and 18b are both turned OFF regardless of the states of the signals S71 and S72 output by the comparator circuit 16.

A rising characteristic (rate of rise) of the current flowing through the coil 1a when the transistors 18a and 18b are both turned ON is determined by a time constant of the circuit and cannot be changed by control. However, because a falling characteristic (rate of fall) of the current changes in shutting off the current when turning both transistors 17a and 18b OFF and when switching of transistor 18a OFF and of keeping the transistor 17b ON, the rate of fall of the current may be regulated by switching them. That is, the change of the current is fast when transistors 18a and 18b are both turned OFF and the change of the current is slow when transistor 18a is switched OFF and transistor 18b is kept ON.

When there is almost no charge in target values of the current (Vr1, Vr2), a deviation between the reference level (Vr1) and the level of an actual current flow (Vs6) will not increase even when the falling rate of the current is slow, so that the state of Vs6<Vr2 are always maintained. Accordingly, a fluctuation width of the current is small at this time. When the target values of the current (Vr1, Vr2) are changed in switching phases of coils to be energized for example, it turns out to be Vs6>Vr2 when the falling rate of the current is slow. In this case, the transistors 18a and 18b are both turned OFF, so that the falling rate of the current rises and the current quickly changes following to the target values (Vr1, Vr2). When the target values are not changed, the deviation between the reference voltage Vr1 and the current level Vs6 becomes small, so that the falling rate of the current becomes slow again.

It then not only prevents the follow-up retardation of the current to the change of the target value, but also to suppress vibration and noise from occurring because the rate of change of the current is slow when the change of the target value is small.

When the failing rate of the current is to be switched by the signals S71 and S72 output by the comparator circuit 16 shown in FIG. 2, an actual switching timing is liable to retard more or less from the optimum point of time as its switching timing. That is, although it is ideal to quicken the fall of the current at the point of time when the target value sharply drops, the temporal retardation occurs because the signal S72 does not turn to L unless the deviation of the current actually becomes large. Therefore, when the target value changes very quickly, the follow-up quality of the current to the target value may not be enough just be the automatic switching of the change rate by the signals S71 and S72.

Then, in the present embodiment, the falling rate of the current may be quickened regardless of the magnitude of the current (Vs6) by controlling the signal S5. That is, when the signal S5 is turned to low level L, the transistors 18a and 18b are turned off in the same time regardless of the signals S71 and S72, so that the falling rate of the current is quickened.

As shown in FIG. 2, the current waveform generating circuit 15 outputs the two kinds of reference voltages Vr1 and Vr2 and the binary signal S5. The reference voltages Vr1 and Vr2 and the binary signal S5 are generated based on information stored in memories (RAM) 15b, 15a and 15c. The memories 15b, 15a and 15c hold data of 8 bits, 8 bits and 1 bit, respectively, in the respective addresses. The 8 bit data read from the memory 15a is converted into analog voltage by a D/A converter 15e and becomes the reference voltage Vr2 via an amplifier 15g. Similar to that, the 8 bit data rear from the memory 15b is converted into analog voltage by a D/A converted 15f and becomes the reference voltage Vr1 via an amplifier 15h. Level of an analog signal S1 output by the CPU 11 is also added to inputs of the amplifiers 15g and 15h. It allows the reference voltages Vr1 and Vr2 to be controlled finely by controlling the level of the signal S1. The 1 bit data output by the memory 15c becomes the signal S5 via an AND gate 15i. A binary signal (start/stop signal) S3 output by the CPU 11 is applied to one input terminal of the AND gate 15i. The signal S3 is always at high level H when the SR motor 1 is driven, so that the output signal of the memory 15c becomes the binary signal S5 as it is.

The memories 15a, 15b and 15c have a large number of addresses, respectively, and each address corresponds to each (in unit of 1 degree) rotational position (angle) of the rotor R. An address decoder 15d generates address information from a signal S9 showing the rotational position of the rotor detected by the angle sensor 1d. This address information is input to address input terminals of the three sets of memories 15a, 15b and 15c at the same time. Accordingly, when the SR motor 1 rotates, the memories 15a, 15b and 15c output data held in each address corresponding to the rotational position of the rotor one after another. Accordingly, the status of the reference voltages Vr1 and Vr2 and the binary signal S5 may change per every rotational position.

Figure 3:
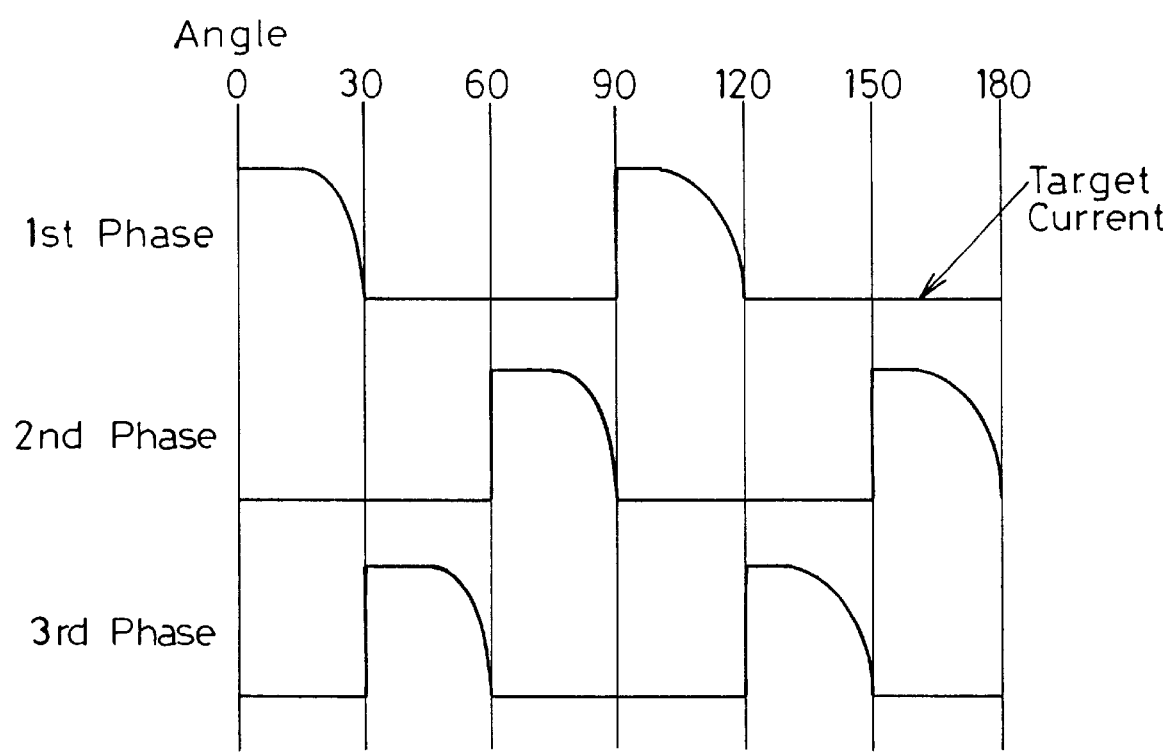
FIG. 3 is a time chart showing examples of waveform specifying an excitation current in driving the SR motor 1 shown in FIG. 1.
Figure 4:
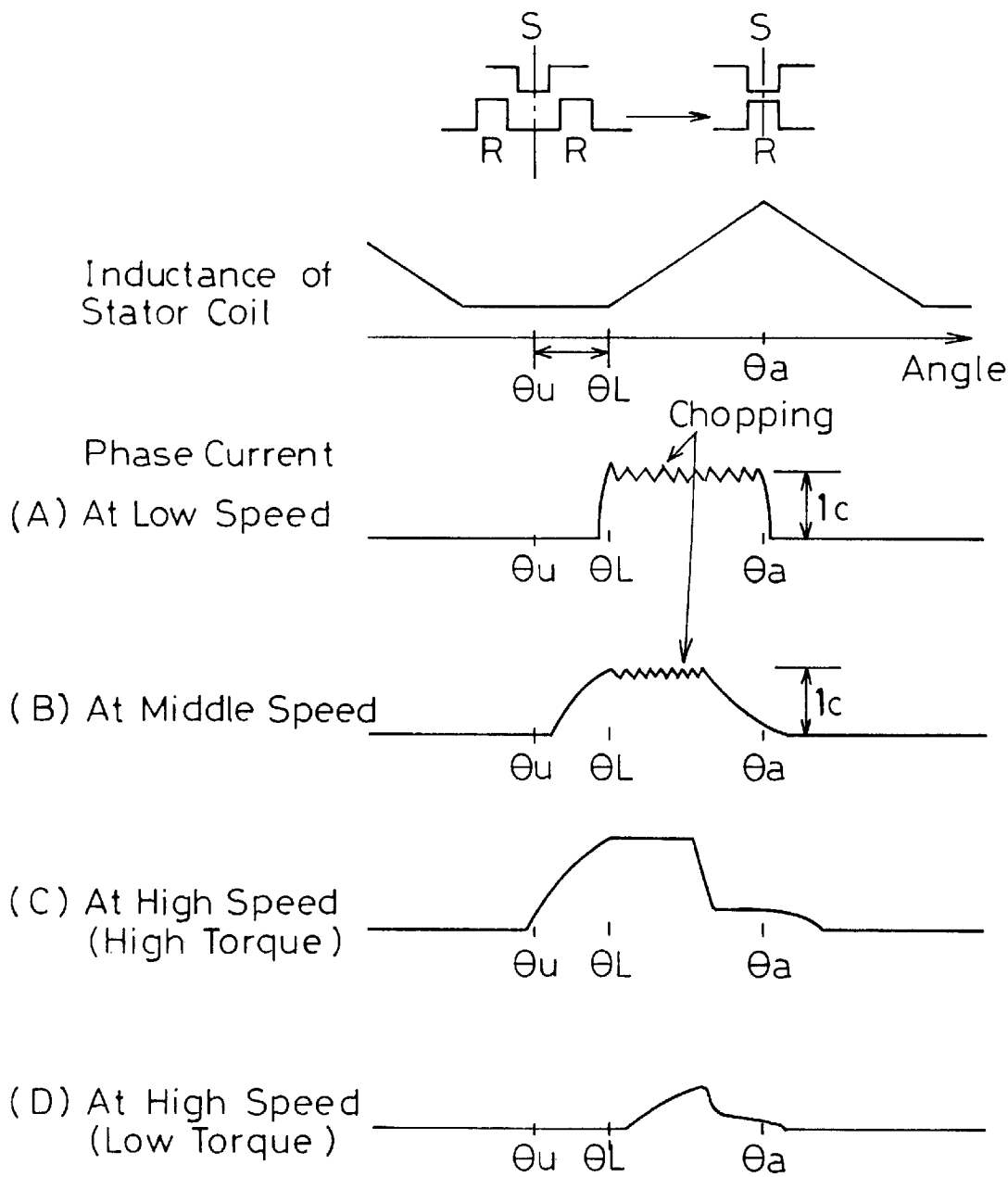
FIG. 4 is a time chart showing changes of the waveforms of the excitation current flow to the SR motor 1 shown in FIG. 1 corresponding to driving conditions.
Figure 7:
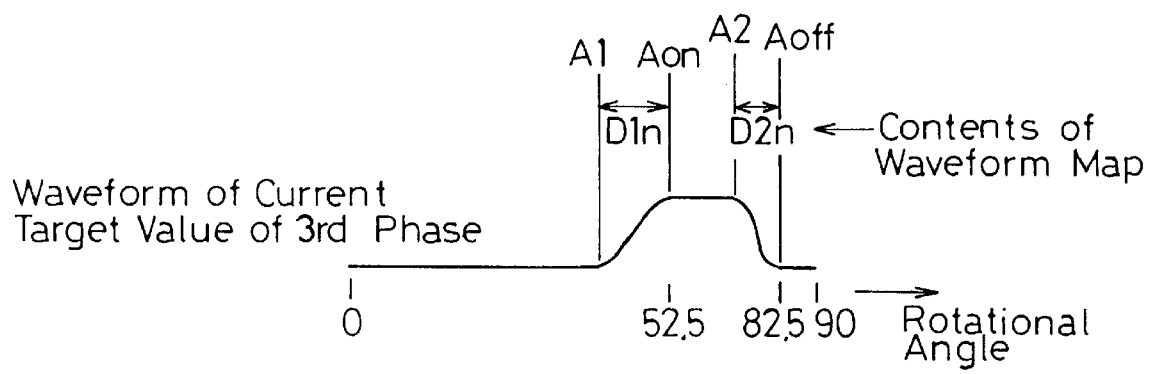
FIG. 7 is a map showing part of data written to memories 15a through 15c shown in FIG. 2.

Actually, information of an energization map as shown in FIG. 7 is held in the memories 15a and 15b, respectively, in order to flow currents having waveforms as shown in FIG. 3 to the three phases of coils. That is, a target value of a current to be set at that position is held in the address each corresponding to a rotational position (every 0.5 degrees in this example). Because information of the memories 15a and 15b correspond to the reference voltages Vr2 and Vr1, respectively, the content of the memory 15a is slightly different from that of the memory 15b so that the relationship of Vr2>Vr1 is satisfied. Because the level of the current flowing through the coil 1a changes so as to follow up the reference voltage Vr1, the currents may flow as shown in FIG. 3 by registering the waveforms of the current to flow to the coil 1a in the memories 15b and 15a as the reference voltages Vr1 and Vr2.

While it is necessary to switch the energization/non-energization to the three phases of coils 1a, 1b and 1c every time when the rotor rotates by 30 degrees as shown in FIG. 3, the energization/non-energization of every 30 degrees may be switched automatically by the signals S71 and S72 by registering the waveforms as shown in FIG. 3 in the memories 15b and 15a. That is, the CPU 11 is not required to perform the switching of the energization/non-energization of each coil.

As for the memory 15c, while information of "1" corresponding to the high level H of the signal S5 is held in most of the addresses, information of "0" (coercive disconnect information) corresponding to the low level L of the signal S5 is held in addresses corresponding to an angle where the target values (Vr1, Vr2) of the current sharply drop. That is, at the rotational position where an inclination of the fall is sharp like the point of time when the waveform of the target values (Vr1, Vr2) of the current starts to fall and it is assumed in advance that it is better to quicken the rate of change of the current, the signal S5 is switched to low level L by the information stored in memory 15c, without waiting to be automatically switched by the signal S72, to quicken the rate of change of the current coercively.

Data may be written in and read from memories 15a, 15b and 15c and data may be written and read at the same time. Memories 15a, 15b and 15c are connected to the CPU 11 via a signal line S2 and the CPU 11 updates the contents of memories 15a, 15b and 15c as necessary.

Figure 5:
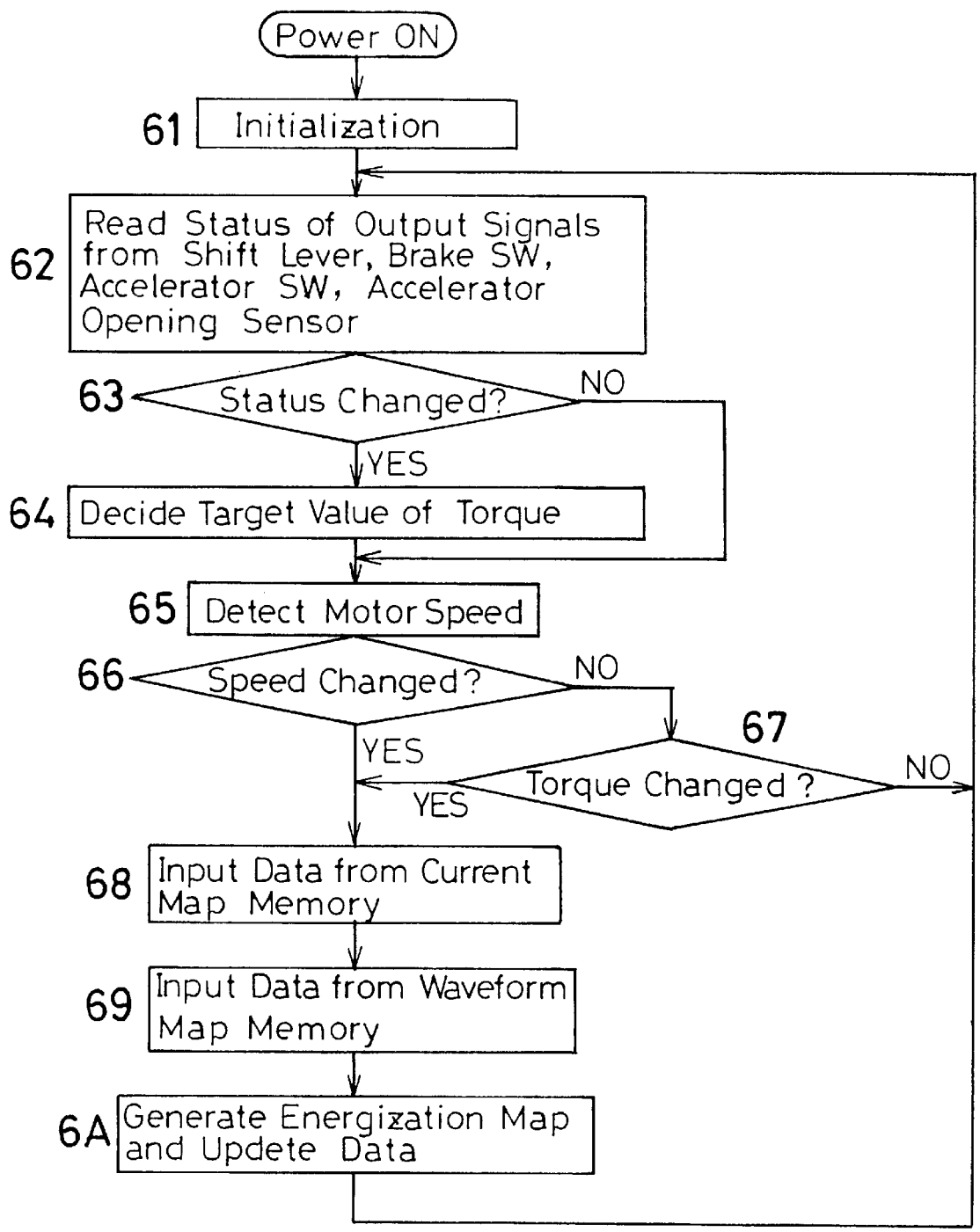
FIG. 5 is a flowchart showing operation of the CPU 11 shown in FIG. 1.

FIG. 5 shows an outline of the operation of the CPU 11. When the power is turned on, the CPU 11 executes the initialization in Step 61. That is, it implements diagnosis of the system after initializing an internal memory of the CPU 11 and after setting modes of an internal timer, interruption and the like. When the system is normal, it advances to the next process.

In Step 62, the CPU 11 reads status of the signals output respectively from the shift lever, the brake switch, the accelerator switch and the accelerator opening sensor via the input interface 12 and stores the data of that status in the internal memory. When there is some change in the status detected in Step 62, the process advances from Step 63 to Step 64. When there is no change, the process advances from Step 63 to Step 65.

In Step 64, based on the various status detected in Step 62, the CPU 11 decides a required driving direction (specified direction) of the SR motor 1, outputs the signal S10 (H:CW/ L:CCW) indicating the driving direction to the exclusive NOR gate 17d and decides a target value of driving torque. For instance, when the accelerator opening detected by the accelerator opening sensor increase, the target value of driving torque is also increased. Here, a torque change flag indicating a change of target torque is also set.

In Step 65, the CPU 11 detects a rotational speed of the SR motor 1. Because bit data of angle detected data (11 bits) of the angle sensor 1d changes corresponding to the rotation of the rotor of the SR motor 1 and its cycle of change is inversely proportional to the rotational speed in the present embodiment, the CPU 11 calculates the motor rotational speed by measuring the cycle of change of the lower bits. The data of the calculated rotational speed is stored in the internal memory.

When the rotational speed of the SR motor 1 changes, the process advances from Step 66 to Step 68 and when there is no change in the rotational speed, the process advances to Step 67. In Step 67, the status of the torque change flag is checked and when the flag has been set, i.e. the target torque has been changed, the process advances to Step 68 and when there is no change in the torque, the process returns to Step 62.

Figure 6:
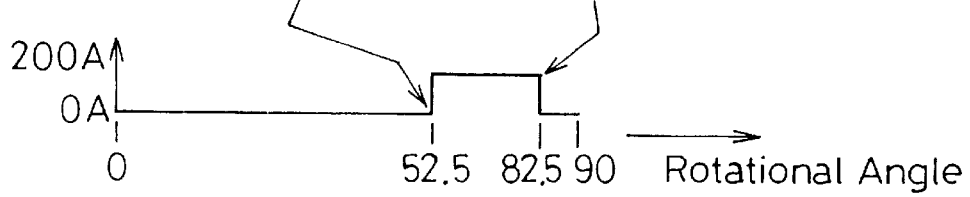
FIG. 6 is a map showing contents of part of data of a current map memory 13a shown in FIG. 1.

In Step 68; the CPU 11 inputs data from the current map memory 13a and in Step 69, inputs data from the waveform map memory 13b. In the present embodiment, the current map memory 13a and the waveform amp memory 13b are composed of a read only memory (ROM) in which various data have been registered in advance. Detta as shown in FIG. 6 is held in the current map memory 13a and data as shown in FIG. 10 is held in the waveform map memory 13b.

That is, large number of data Cnm (N:numerical value in columns corresponding to torque, m: numerical value in rows corresponding to a number of revolutions) corresponding to various target: torque and various numbers of revolutions (rotational speed of the motor) are held in the current map memory 13a. An energization ON angle, an energization OFF angle and a current target value are contained in one set of the data Cnm. For instance, the contents of data C34 when the torque is 20 (N-m) and the number of revolutions is 500 [rpm[ are 52.5 degrees, 82.5 degrees and 200 [A]. That is, a current of 200 A flows to a specific coil within a range of 52.5 to 82.4 degrees within a range of 0 to 90 degrees of rotational position and that the current is shut off within ranges of 0 to 52.5 degrees and of 82.5 to 90 degrees. In Step 68, the CPU 11 inputs one set of data Cnm selected corresponding to the torque and the number of revolutions at that time.

However, the target value of the current which actually flows to the coil does not change in a shape of an ordinary rectangular wave but assumes a waveform whose leading edge and falling edge are moderate. This waveform is decided based on the waveform amp memory 13b.

Figure 10:
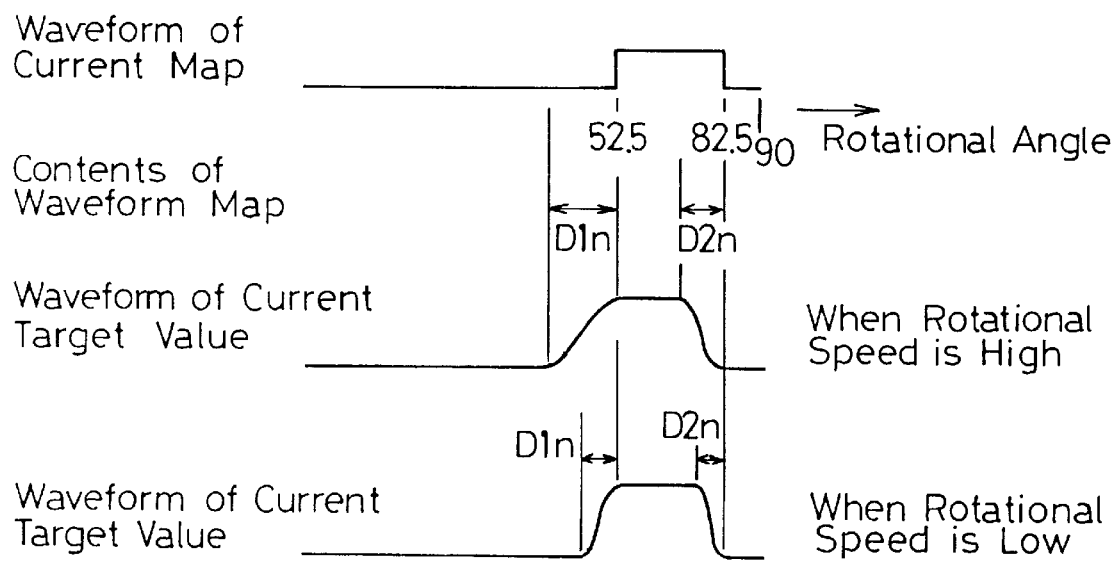
FIG. 10 is a map showing contents of part of data of a waveform map memory 13b shown in FIG. 1.

As shown in FIG. 10, a large number of data D1n and D2n (n: numerical value of rows corresponding to the number of revolutions) corresponding to various numbers of revolutions (motor rotational speed) are held in the waveform map memory 13b. The data D1n indicates a rising required angle, i.e. a variation of rotational angel for rising the current from low level (0[A])to high level (e.g. 200 [A]/The data D2n indicates a falling required angle, i.e. a variation of rotational angle for falling the current from the high level (e.g. 200[A]) to the low level (0[A]).

For instance, when the data of C34 of the current map shown in FIG. 6 is used, the rise of the current target value is started from the position before 52.5 degrees, i.e. the energization ON angle, by an angle of D1n and the waveform of the current target value is changed so that it rises moderately up to 100% at 52.5 degrees. The fall of the current target value is started at the position before 82.5 degrees, i.e. the energization OFF angle, by an angle of D2n and the waveform of the current target value is changed moderately so that the fall is completed at 82.5 degrees.

Data D1n and D2n of the waveform map memory are defined in advance so that the rise and fall of the current change at the optimum time (angle) per each number of revolutions [rpm]. That is, when the rise and the fall are too fast, a differential value of magnetic flux in switching the excitation becomes large, thus causing vibration and large noise. When the rise and fall are too slow, the driving torque drops Remarkably and the driving efficiency drops. Thus, values which can fully suppress the vibration and noise and which reduce the drop of the driving efficiency are defined as D1n and D2n. Further, the rise time corresponding to D1n and a fall time corresponding to D2n are both defined so that they are larger than a half of a cycle of natural frequency (resonance frequency) of the SR motor 1. Thus, the frequency of vibration caused in switching the excitation is lowered more than the natural frequency of the SR motor 1, so that it allows to prevent resonance and to suppress the vibration and noise levels from increasing.

In Step 69 in FIG. 5, one set of data D1n and D2n is selected from the waveform map memory 13b by a number of revolutions at that time and is input to the CPU 11. For instance, when the number of revolutions is 500 [rpm] data D14 and D24 are selectively input.

In Step 6A, based on the data Cnm input in Step 68 and the data D1n and D2n input in Step 69, data of an energization map as shown in FIG. 7 is generated and the data in the memories 15a, 15b and 15c of the current waveform generating circuit 15 shown in FIG. 2 is updated (rewritten) by this latest energization map. As a matter of course, the energization map is created for and written not only in the memories 15a, 15b and 15c of one phase shown in FIG. 2. Energization maps are created for and are written into the memories of all three phases.

Actually, the energization map is created as follows. In case of the third phase, a current target value at angular position A1 obtained by subtracting the rise required angle D1n from the energization ON angle Aon contained in the data Cnm is set at 0 and a current target value of the position of the energization ON angle Aon is set at a current target value (e.g. 200[A]) contained in Cnm and data is interpolated between the angular positions A1 and Aon so that they are connected by a smoothly rising curve. That is, values approximate to the curve are calculated and found per every 0.5 degrees and each of them are set as the current target values at each angle. Similarly, a current target value at angular position A2 obtained by subtracting the fall required angle D2n from the energization OFF angle Aoff contained in the data Cnm is set at a current target value (e.g. 200[A]) and a current target value at the position of the energization OFF angle Aoff is zeroed and data is interpolated between the angular positions A2 and Aoff so that they are connected by a smoothly rising curve. That is, values approximate to the curve are calculated and found per every 0.5 degrees of the rotor angle and each of them are set as the current target values at each angle. As for the angular position other than those described above, 0 is written as a current target value.

Figure 8:
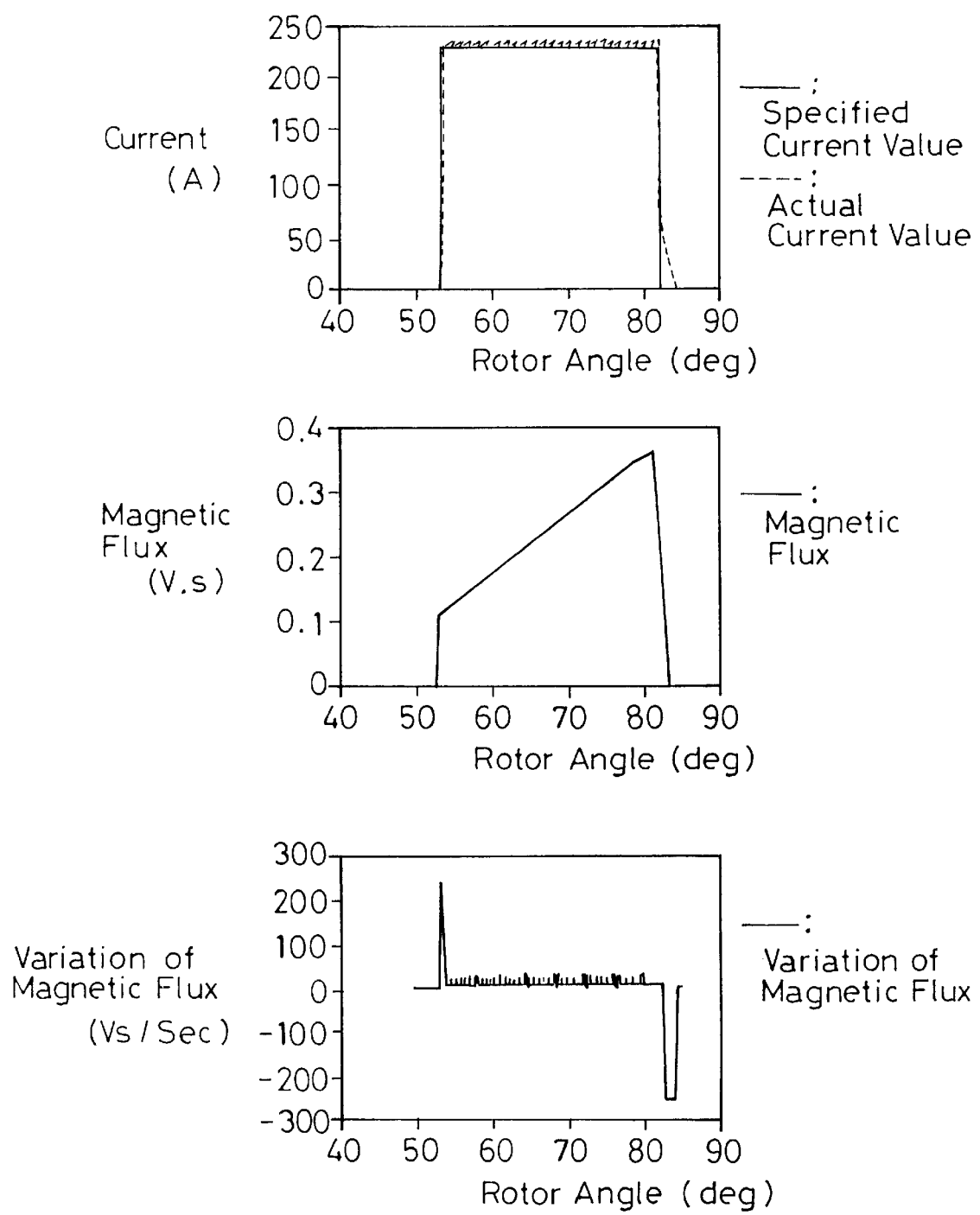
FIG. 8 is a time chart showing a current, a magnetic flux and a change in magnetic flux when a normal energization control is performed in the SR motor.
Figure 9:
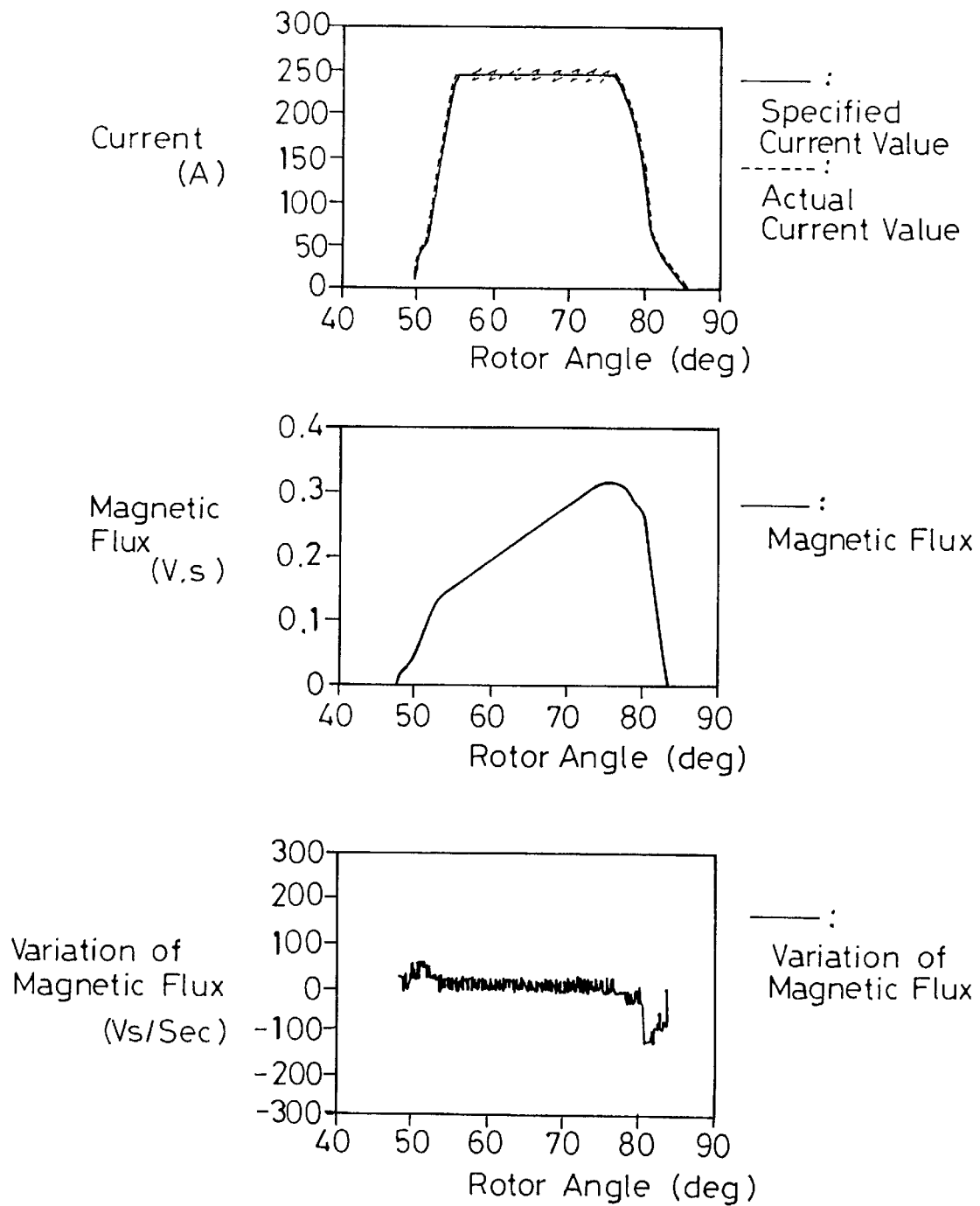
FIG. 9 is a time chart showing a current, a magnetic flux and a change in magnetic flux when the rise and fall of the current of the SR motor are changed moderately.

For the first and second phases, data obtained by shifting the data of the energization map of the third phase by 30 degrees and 60 degrees are used as they are. Thus, the energization map as shown in FIG. 7 may be created. It is noted that the energization map shown in FIG. 8 shows only data (Vrt) written to the memory 15b and data written to the memory 15a is slightly larger than the value of the energization map in FIG. 7.

Because the current flowing through the coil 1a is controlled based on the data in the memories 15a, 15b and 15c, the excitation of each coil is switched automatically by the hardware circuit according to the energization map written by the CPU 11 to the memories (three phases of memories 15a, 15b and 15c).

The CPU 11 repeatedly executes the processes of the above mentioned Steps 62 through 6A. Then, while the processes of Steps 66, 67 and 62 are executed when the detected rotational speed and the torque of the SR motor 1 are constant, the processes of steps 68, 69, 6A and 6B are executed when the rotational speed or the torque has changed, so that the energization maps on memories 15a, 15b and 15c are updated.

According to the embodiment described above, even when the condition of performing the soft chopping (Vr1<Vs6<Vr2) holds and the transistor 18a should be turned off and the transistor 18b should also be turned off originally, an output of the exclusive NOR gate 17d turns out to be L and an output of the AND gate 17c is restricted by L and therefore, an output of the AND gate 17a is restricted by L, thus turning off the transistor 18b, when the actual rotational direction detected by the direction detecting circuit 5 and indicated by the signal S11 is different from the rotor rotating direction which the CPU 11 has specified by the signal S10. Thus, the current feeds back (regenerates) to the power line 18e as shown in FIG. 11b in the electric motor right after when the transistor is turned off and no excessive current flows through the transistor 18b, so that it will not be destroyed.

While the invention has been particularly shown and described with reference to preferred embodiments thereof, it will be understood by those in the art that the foregoing and other changes in form and details may be made therein without departing from the spirit and scope of the invention.

What is claimed is:

1. An energization controller of an electric motor, comprising:

first switching means interposed between one end of an electric coil of said electric motor and a first power line;

second switching means interposed between the other end of said electric coil and a second power line;

a first diode which is interposed between the other end of said electric coil and said first power line and which permits a current to flow from the former to the latter;

a second diode which is interposed between the other end of said electric coil and said first power line and which permits a current to flow from the former to the latter;

chopping control means for selectively performing hard chopping of alternately repeating a switch-on operation of turning on both the first and second switching means and a switch-off operation of turning off both the first and second switching means and soft chopping of alternately repeating a switch-on operation of turning on both the first and second switching means and a singular-on operation of turning off said first switching means and turning on said second switching means;

direction detecting means for detecting a rotational direction of said electric motor; and chopping mode control means for detecting whether or not the rotational direction coincides with a specified direction and for instructing control means to perform the hard chopping during when those directions do not coincide.

2. The energization controller of the electric coil described in claim 1, wherein said electric motor is a switched reluctance motor.

* * * * *

UNITED STATES PATENT AND TRADEMARK OFFICE
CERTIFICATE OF CORRECTION

| | | |
|---|---|---|
| PATENT NO. | : 6,008,601 | Page 1 of 1 |
| DATED | : December 28, 1999 | |
| INVENTOR(S) | : Masanori Sugiyama | |

It is certified that error appears in the above-identified patent and that said Letters Patent is hereby corrected as shown below:

<u>Title page,</u>
Item [30] Foreign Application Priority Data: please insert -- May 30, 1997 (JP)..............................09-142289 --.

Signed and Sealed this

Fifth Day of March, 2002

Attest:

Attesting Officer

JAMES E. ROGAN
*Director of the United States Patent and Trademark Office*